United States Patent [19]
Chacour et al.

[11] Patent Number: 4,955,789
[45] Date of Patent: Sep. 11, 1990

[54] DUPLEX TURBINE REPLACEMENT UNIT AND METHOD

[75] Inventors: Selim A. Chacour; William H. Colwill, both of York, Pa.

[73] Assignee: American Hydro Corporation, York, Pa.

[21] Appl. No.: 342,961

[22] Filed: Apr. 24, 1989

[51] Int. Cl.[5] .............................................. F04D 29/60
[52] U.S. Cl. .................... 415/201; 415/101; 415/118; 415/213.1; 290/43; 248/679
[58] Field of Search ....................... 415/93, 94, 99, 101, 415/103, 118, 165, 166, 201, 912, 213.1; 290/43, 52, 54; 248/679

[56] References Cited

U.S. PATENT DOCUMENTS

| | | | |
|---|---|---|---|
| 588,502 | 8/1897 | Stilwell | 415/101 |
| 634,967 | 10/1899 | Tyler | 415/101 |
| 1,007,230 | 10/1911 | Orten-Boving | 415/201 |
| 1,018,278 | 2/1912 | Tappan | 415/201 |
| 4,224,526 | 9/1980 | Margison et al. | 290/52 |
| 4,575,307 | 3/1986 | Shinohara | 415/165 |

FOREIGN PATENT DOCUMENTS 289592 1/1916 Fed. Rep. of Germany ...... 415/101
327160 2/1920 Fed. Rep. of Germany .

OTHER PUBLICATIONS

FIG. 4 on p. 22, Sep., 1988, Issue of "Water Power & Dam Construction".

Primary Examiner—John T. Kwon
Attorney, Agent, or Firm—Samuel M. Learned, Jr.

[57] ABSTRACT

A duplex turbine replacement unit to up-grade an obsolete or worn out quad turbine unit and thereby obtain enhanced power plant operational and output efficiencies, while at the same time providing a turbine profile and method of installation wherein the duplex turbine replacement unit hereof conveniently adapts to utilizing the existing draft tube discharge floor holes as originally provided for the replaced quad turbine unit draft tube discharges thereby eliminating the extensive and expensive civil engineering site modification and re-work that would otherwise be necessary with conventional commercially available up-grading replacement turbine units, in addition to also providing a turbine replacement unit having an internally housed and protected wicket gate adjustment mechanism which thereby substantially reduces the hazard of damage thereto by entrained debris in the turbine water.

6 Claims, 4 Drawing Sheets

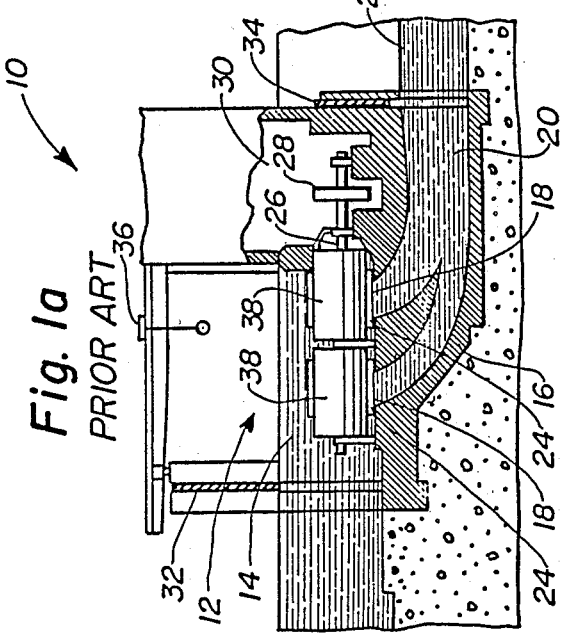

DUPLEX TURBINE REPLACEMENT UNIT AND METHOD

BACKGROUND OF THE INVENTION

There are many moderate sized hydroelectric power plant operations throughout the United States and elsewhere running antiquated and worn out quad turbines to drive power generators in places where the power demand for generation capacity of an older quad unit power plant remains, but the operational cost per unit of power delivered out of the plant, even when the original quad turbine unit is maintained in as currently a cost effective and optimally mechanical state of operation as possible, is simply not competitive with power generated by other means within the grid. Under the foregoing circumstances, the option is to up-grade the original equipage quad turbine unit with a modern turbine unit of greater operational efficiency and lower maintenance and manning costs. The draw-back problem of exercising a turbine up-grade replacement option under circumstances of the foregoing conditions, however, is that the design profiles of currently available up-grade turbine replacement units are not mechanically compatable with the existing power plant quad unit civil structure, and as a cost of up-grade turbine unit replacement one has not only the new turbine plus turbine control and auxiliary costs, but is also confronted with a frequently more substantial and additional civil structure re-work and construction cost to accommodate the installation and support of the up-grade turbine unit. The result is that the turbine up-grade replacement option usually becomes no longer economically feasible, that is, the total capital cost burden is not recovered by operational revenues in a reasonable time.

The present invention relates to a practical and economic up-grade turbine replacement unit based on a duplex design, which optimizes replacement economies by minimizing civil engineering modification costs in effecting its installation and replacement of a quad unit. The duplex turbine unit of present invention also incorporates the unique mechanical feature of protectively housing the wicket gate control mechanism and adjustment linkages within the turbine casing to thereby protect the same from being damaged by entrained debris in the turbine water.

The major construction changes that are typically encountered in adapting an existing power plant civil structure from a quad turbine installation to an up-graded operation employing say a bulb, pit, or S-turbine are generally as illustrated and described in FIG. 4 on Page 22, of the Sept., 1988, issue of "Water Power & Dam Construction", and as therein shown the civil structure re-work and modifications involve a major construction project. And, as previously pointed out, frequently the determinative factor is not the capital cost of the up-grading turbine replacement unit but rather the capital construction cost in preparing the power plant site to receive that unit.

A typical duplex profiled turbine unit as shown in German Pat. No. 327,160 dated Feb. 26, 1920, which has a single runner with blades on both sides of the hub and a corresponding double discharge, utilizes pressurized water rather than an open flume source, and has a single set of wicket gates with the adjustment mechanism therefor exterior of the turbine casing. A teaching showing the wicket gate adjustment mechanism interior of a power station housing, but not the turbine casing, is as set forth in U.S. Pat. No. 4,224,526 to Margison et al dated Sept. 23, 1980.

The duplex turbine and associated running gear for the generation of electrical power is not per se new. What is new in terms of the turbine structure is the novel manner in which the various elements and components are assembled in order to provide unique and useful results not heretofore known, and secondly in terms of utility the manner in which the new and novel turbine profile is used as an up-grade replacement turbine unit in combination with an existing power plant civil structure without the need or necessity for major and expensive re-working thereof so that now an alternative turbine replacement unit up-grade option is available which provides the operational economies of an up-graded turbine unit without the prohibitive civil structure modification and re-work capital construction cost.

SUMMARY OF THE INVENTION

It is the principal object of the present invention to provide a duplex turbine replacement unit to be utilized in upgrading a hydroelectric power plant having an obsolete or worn out quad turbine unit, wherein the duplex turbine replacement unit hereof may be readily installed without the extensive and expensive civil engineering site modification and re-work that would otherwise be necessary with conventional commercially available up-grading replacement turbine units.

A more specific object of the present invention is to provide a duplex turbine replacement unit which is profiled to conveniently adapt the draft tube discharges thereof to utilize existing floor holes as originally provided for the replaced quad turbine unit draft tube discharges.

It is also an object of the present invention to provide a duplex turbine replacement unit that adjustably operates efficiently within an electro-mechanical output range compatible with that of the operational range of the existing power station electrical generator unit.

It is a further object of the present invention to provide a turbine structure wherein the wicket gate operating mechanism and control unit is safety housed within a protective air chamber formed by the turbine casing to thereby substantially reduce the hazard of damage thereto by entrained debris in the turbine water.

It is another object of the present invention to provide a duplex turbine replacement unit having the turbine drive shaft bearings therefor factory aligned within the turbine casing prior to shipment, thereby substantially reducing the on-site installation time, costs, and mechanical problems otherwise associated with field-alignment of turbine drive shaft bearings.

Yet another object of the present invention is to provide a duplex turbine replacement unit design with the runners arranged back-to-back to thereby operationally provide a dynamically balanced hydraulic thrust condition.

Still another object of the present invention is to provide a duplex turbine replacement unit having a snorkel access tube extending from the submerged turbine casing to above the headwater chamber water surface level to allow access to the wicket gate operating mechanism and control unit and turbine bearings for inspection and servicing without the need to dewater the headwater chamber.

It is an additional object of the present invention to provide a duplex turbine replacement unit which embodies an efficient hydraulic design and is mechanically simple thereby enabling both ease of installation and alignment as well as substantially reduced maintenance requirements.

The foregoing, and other objects hereof, will be readily evident upon a study of the following specification and accompanying drawings comprising a part thereof.

BRIEF DESCRIPTION OF THE DRAWINGS

FIG. 1a is a simplified cutaway side elevation view illustration of a typical prior art power plant, having been originally equipped with a conventional quad turbine installation.

FIG. 1b is a simplified cutaway side elevation view illustration showing a typical replacement installation employing a turbine unit of that type currently and generally available for up-grade of the subject prior art power plant from a quad turbine installation to a more efficient operational and output power plant facility.

FIG. 2 is a simplified cutaway side elevation view illustration showing a replacement installation employing the duplex turbine replacement unit and method of the present invention for accomplishing an up-grade of the subject prior art power plant from a quad turbine installation to a power plant facility of operational and output efficiency comparable to that otherwise achievable with the currently and generally available replacement turbine units of that type shown in FIG. 1b, but without the necessity for and additional cost of substantial civil structure re-work as also shown in FIG. 1b.

DETAILED DESCRIPTION OF THE INVENTION

Figure 3:
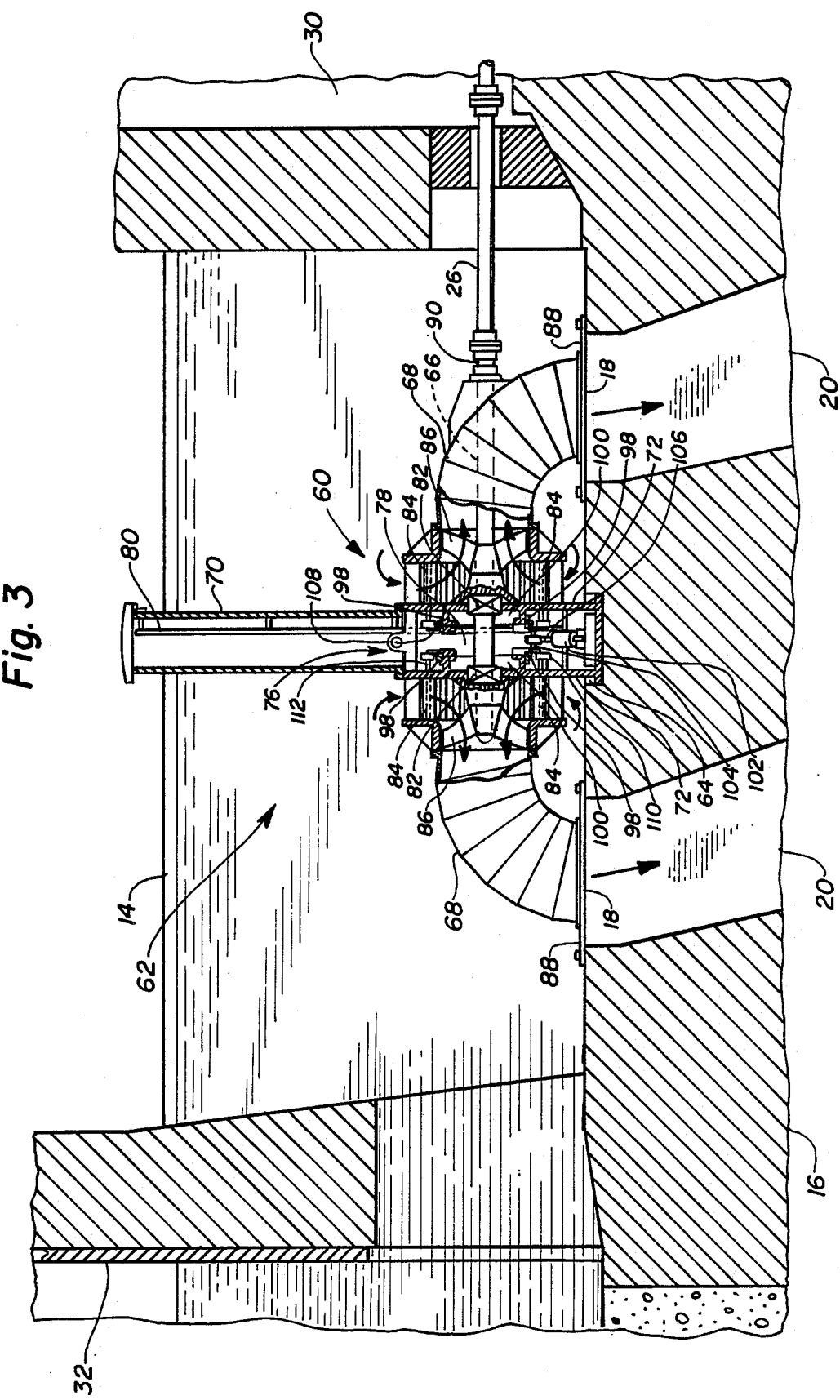
FIG. 3 is an enlarged vertical sectional view of the simplified FIG. 2 illustration, herein, however, showing greater detail of the duplex turbine replacement unit of present invention and the installation method therefor.

Referring to FIG. 1a, a simplified cutaway side elevation view of a typical prior art power plant 10 is shown as the same would generally appear when having been typically equipped with a conventional quad turbine installation 12 for submerged operation thereof as shown within a headwater chamber 14 formed by a civil structure containment and foundation 16 which serves to both support said installation 12 and also provide a set of floor holes 18 therein each with a tail water discharge conduit 20 connectably communicating therefrom to the tail water discharge 22, and to which the dual unit quad turbine draft tube discharges 24 are connected for exhaust of turbine water. As additionally shown the quad turbine 12 is connected by means of a drive shaft 26 to a generator 28 which is housed within a generator room 30 of the power plant 10, the civil structure thereof which may also be provided with a headwater inlet control gate 32 and a tail water discharge control gate 34. Lastly, the power plant 10 is typically provided with an overhead crane unit 36 which is utilized for removal of turbine units 38 for repair or replacement and general rigging use operations within said power plant 10. Operation of the typical prior art power plant 10 is in accordance with those methods and procedures well known and long established in the art, and is therefore not herein detailed since the purpose of FIG. 1a is to show only layout and general operational positioning of the major operational components and support structures of a typical prior art power plant 10 equipped with a conventional quad turbine installation 12 for structural comparative purposes with a typical prior art up-grade turbine replacement unit 40 as generally shown in FIG. 1b.

The illustration shown in FIG. 1b is a corresponding simplified cutaway side elevation view similar to that as shown in FIG. 1a, but wherein the conventional quad turbine installation 12 has now been replaced, for reasons of obsolescence and/or lack of operational economies such as excessive maintenance and repair costs and/or low operational efficiencies, with a prior art up-grade turbine replacement unit 40 which would typically be a bulb or a pit or S-turbine or the like, which requires substantial civil structure re-work 42 and new foundation modification 44 as shown. The end result of a prior art up-grade turbine replacement unit 40 installation as shown in FIG. 1b in modernizing and maintaining the competitive power production capability of a prior art power plant 10 previously equipped with a conventional quad turbine installation 12 as shown in FIG. 1a, is that there is not only the substantial cost of the new turbine replacement unit 40 but also the mechanical modification costs necessary to adapt the connection thereof to the existing generator 28, and even more significant the substantial and additional power plant civil structure modification costs in accomplishing the re-work necessary to adapt an existing physical facility to accommodate the new turbine replacement unit 40. Basically, the entire sub-surface civil structure between the headwater inlet control gate 32 and the tail water discharge control gate 34 of the prior art power plant 10 is significantly changed to accommodate the physical facility to the typical prior art up-grade turbine replacement unit 40. There is a new headwater supply 46, a new tail water discharge conduit 48, and the generator room 30 has been vacated in favor of a newly constructed generator pit 50 accessed by way of a manhole 52, and maintenance and repair access to both the relocated generator 54 and typical prior art up-grade turbine replacement unit 40 are substantially reduced being even much more restricted than that previously provided to the generator 28 and turbine units 38 in the original installation as shown in FIG. 1a.

Referrring now to FIG. 2, the typical prior art power plant 10 is shown with a duplex turbine replacement unit 60 of instant invention erected therein as the same would typically appear in a quad turbine replacement installation 62, wherein it can be clearly seen on a comparative viewing of FIG. 1a and FIG. 2, that by utilizing the duplex turbine replacement unit 60 hereof one is thereby enabled to effect a quad turbine replacement installation 62 without the need or necessity for making and civil structure re-work changes or modifications to the power plant 10 physical facility. Consequently, the method of installation of the duplex turbine replacement unit 60 simply involves sealing off and dewatering the headwater chamber 14, and by use of the overhead crane unit 36 connect onto and remove the quad turbine units 38, prepare a duplex turbine replacement unit foundation recess 64 located centrally intermediate the existing draft tube discharge floor holes 18 and so that the turbine drive shaft 66 will be in alignment with the generator drive shaft 26, and then installably erect the unit 60 therein. The turbine drive shaft 66 is thereafter connected to the generator drive shaft 26 and the duplex turbine draft tube discharges 68 connected to the floor holes 18. Final turbine alignment and connection adjustments are made, the snorkel tube 70 which provides operator access to the duplex turbine casing 72 interior is erected, the headwater chamber 14 flooded, the tail water discharge control gate 34 opened, and the duplex turbine up-graded power plant 74 made operational.

Considering now the enlarged vertical sectional view of the installed duplex turbine replacement unit 60 as illustrated in FIG. 3, which is partially cut away to show some structural assembly detail of the turbine 60 interior as well as the wicket gate adjustment mechanism 76, in addition to greater assembly detail of the method of installation. As more specifically shown in FIG. 3, the turbine casing 72 forms the previously mentioned protective air chamber 78 to which operator access is gained by way of the snorkel tube 70 in turn which houses and supports an access ladder 80, and provides entry to the air chamber 78 by operational and maintenance personnel to inspect and service the turbine bearings 82 and the wicket gate adjustment mechanism 76 without the need or necessity of shutting down the turbine unit 60 and dewatering the headwater chamber 14. Of equal, if not greater importance, however, is that the air chamber 78 not only provides facilitated access to, but a protective housing for, the wicket gate adjustment mechanism 76 which would otherwise be external to the turbine casing 72 and in the flow of turbine water which may contain entrained debris and on the passage thereof cause damage to the pivotal linkages by which the wicket gate adjustment mechanism 76 operates.

The illustration of FIG. 3 also shows, by way of the arrows, flow of water from the headwater chamber 14, through the wicket gates 84 and across the runners 86 which as shown in the duplex turbine replacement unit 60 are profiled in a back-to-back arrangement to thereby operationally provide a dynamically balanced hydraulic thrust condition, to exhaust from the runners 86 into the draft tube discharges 68 and into the tail water discharge conduit 20. The importance of a dynamically balanced hydraulic thrust design as aforementioned is two-fold, first it neutralizes opposing torque forces on the turbine drive train and thereby wear problems and maintenance demands, but secondly it allows for a dynamically balanced operational state so that both foundation and affixment requirements for the duplex turbine replacement unit 60 are substantially reduced from the support means and civil structure connection means that would otherwise be prudent absent a dynamically balanced hydraulic thrust design. Thus, the resultant simplicity and reduced cost of installation when taken in combination with the feature and method of being able to adapt the duplex turbine replacement unit 60 installation to the existing power plant 10 physical facility civil structure.

Installation of the duplex turbine replacement unit 60 in structural compatability and harmony with the existing power plant 10 physical facility civil structure as aforementioned is accomplished by supportable installation thereof within the foundation recess 64, which receives and supports the turbine 60 and snorkel tube 70 structures upon lower bearing surfaces of the turbine casing 72 to thereby provide a single pedestal support structure in turn being supportably received as aforesaid within the foundation recess 64 located centrally intermediate the existing draft tube discharge floor holes 18 as shown, with side-lateral support and affixment being by attachment of the respective draft tube discharges 68 to the floor hole 18 openings by means of the draft tube retaining collars 88. The turbine unit 60 thus installed is then aligned for attachment of the turbine drive shaft 66 to the generator drive shaft 26 by means of drive shaft coupling 90, following which the entire unit and auxiliary assemblies are securably affixed for operational utilization.

An additional feature of the duplex turbine replacement unit 60, which adds to the facilitated installation thereof, is that the turbine bearings 82 are factory aligned within the turbine casing 72 prior to arrival at the installation site, thereby substantially reducing the on-site installation time, costs, and mechanical problems otherwise associated with the field-alignment of turbine drive shaft bearings.

Some of the basic structural elements of the wicket gate adjustment mechanism 76 are shown in the cut away portion of FIG. 3, which includes the wicket gate adjustment mechanism slip rings 98 and the slip ring bearing collars 100 upon which the slip rings 98 displace in adjustable rotation when simultaneously driven by the servomotor adjustment means 102 through the slip ring connection arm 104 and servomotor adjustment linkage 106, all of which adjustably controls the turbine water flow through the runners 86 by pivoting the wicket gate blades 84 by adjustment of the slip ring 98 which is mechanically translated through the wicket gate blade adjustment linkages 108 through shaft levers 110 interconnected to shafts 112 and wicket gate blades 84. Greater structural detail and explanation of the wicket gate adjustment mechanism 76 will be given on detailed considerations respectively of FIGS. 4 and 5 hereinafter.

Figure 4:
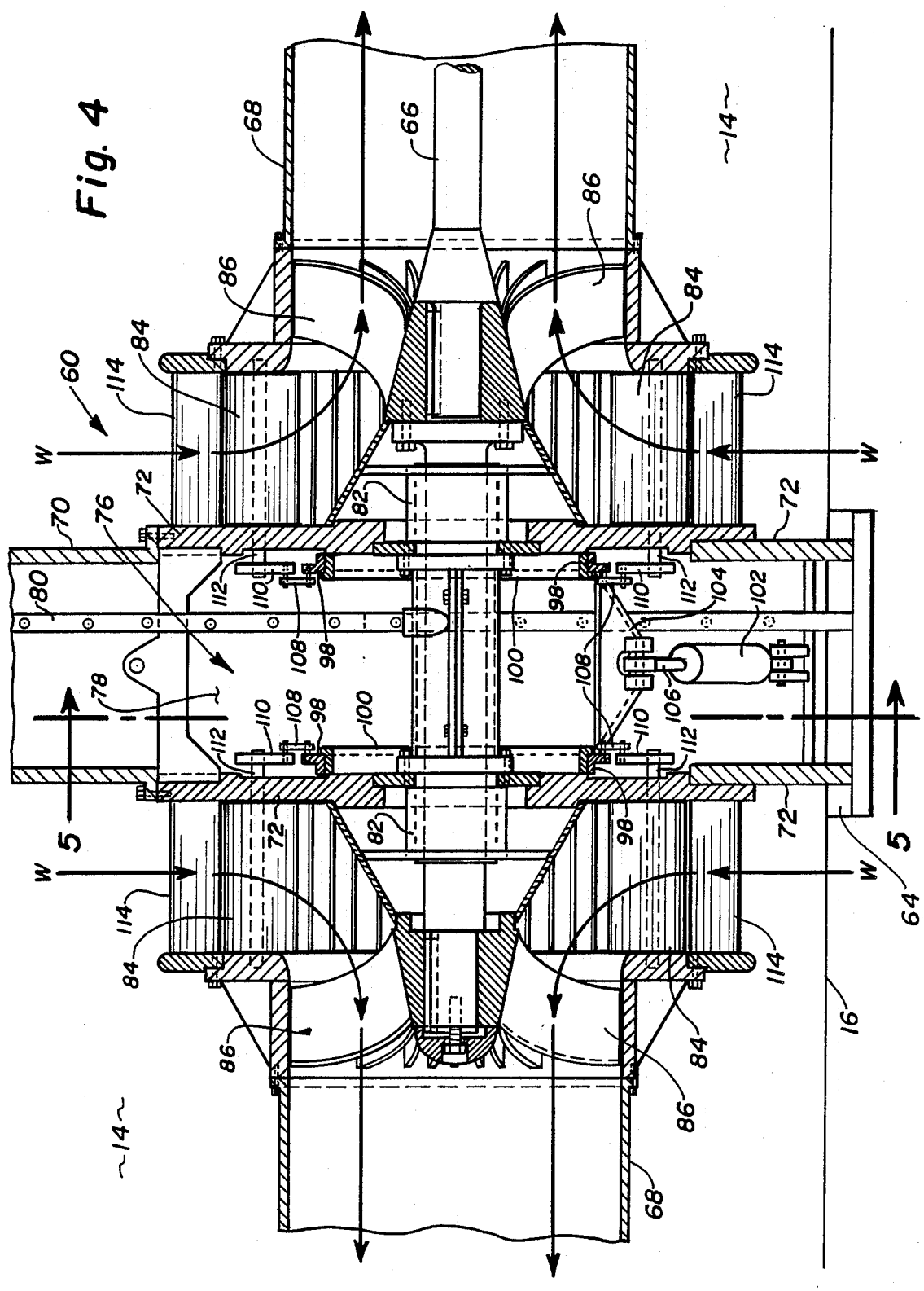
FIG. 4 is an enlarged vertical section of the duplex turbine replacement unit showing the cooperative mechanical assembly detail of the wicket gate adjustment mechanism therefor.

Flow of turbine water through the submerged duplex unit 60 as seen in FIG. 4 is as indicated by the arrows "W", which under headwater pressure from above and below as supplied out of the headwater chamber 14 courses across the stayvanes 114 and past the wicket gate blades 84 in directed guidance through runners 86 to tail water exhaust by way of the draft tube discharges 68. It is, as previously discussed generally, this counter-flow path of turbine water through the back-to-back runner profile of the duplex unit hereof which operationally provides the dynamically balanced hydraulic thrust condition thereby to enable much greater turbine unit 60 and drive shaft 66 stability during running.

Figure 5:
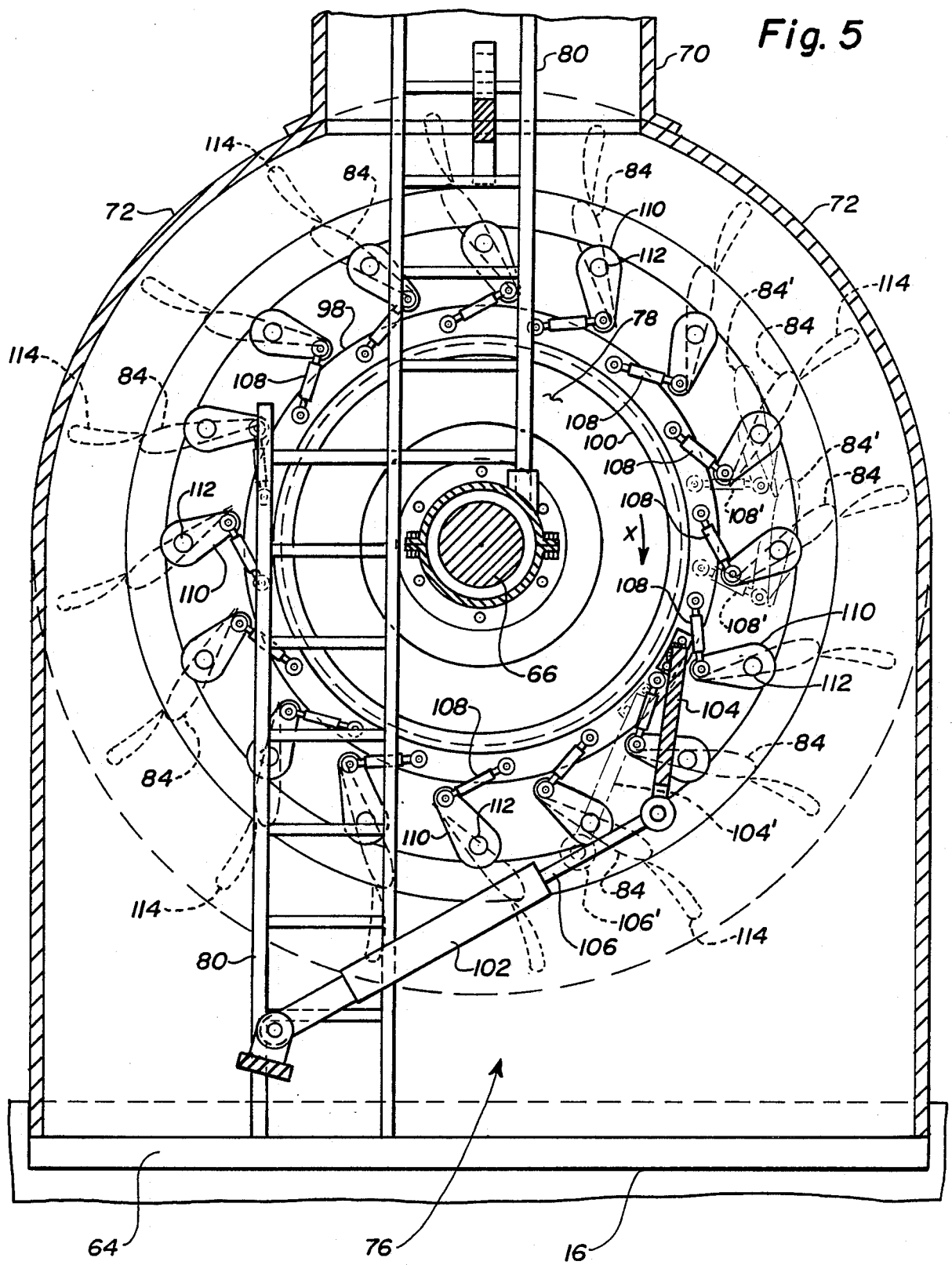
FIG. 5 is an enlarged vertical section of the cooperative mechanical assembly detail of the wicket gate adjustment mechanism as seen along the line 5—5 of FIG. 4.

Considering now concurrently the respective views as seen in FIGS. 4 and 5 in a detailed discussion of both the cooperative structural elements and operation of the wicket gate adjustment mechanism 76, which in FIG. 4 is shown as a vertical sectional view of the duplex turbine replacement unit 60 taken in a plane parallel to the axis of rotation of the turbine drive shaft 66, and in FIG. 5 a vertical sectional view in a plane perpendicular to the axis of rotation of the turbine drive shaft 66 as seen along the line 5—5 of FIG. 4, and as more clearly shown in both of the aforesaid Figures the linkages and interconnected drive for said adjustment mechanism 76 is contained and housed within the protective air chamber 78 formed by the duplex turbine casing 72.

The configuration of the wicket gate blades as shown in FIGS. 4 and 5 are in the open position, that is, the servomotor adjustment linkage 106 of the servomotor adjustment means 102 is extended and the wing surfaces of the wicket gate blades 84 are generally parallel to and on alignment with the wing surfaces respectively of each corresponding stayvane 114, which is most clearly illustrated in the vertical section end view of FIG. 5. At this setting, maximum turbine water flow "W" is discharged through the wicket gates 84 and across the runners 86, and since the respective wicket gate adjustment mechanism 76 assemblies are mechanically identical and joined for concurrent equal adjustable movement by the slip ring connection arm 104 connectably communicating with the servomotor adjustment linkage 106, any adjustment change initiated through the servomotor adjustment means 102 is transmitted as co-equal adjustment setting changes to the respective wicket gate adjustment mechanism 76 assemblies.

In FIG. 5 the servomotor adjustment linkage 106 is alternately shown in the fully retracted position 106', which moves the slip ring connection arm 104 to the closed position 104' as also shown and in turn causing the wicket gate adjustment mechanism slip rings 98 to respectively rotate clockwise by an amount indicated by the arrow "X" thus simultaneously moving all wicket gate blade adjustment linkages 108 concurrently on the respective wicket gate adjustment mechanism 76 assemblies to positions 108' which adjustable movement is mechanically translated through the shaft levers 110 and shafts 112 to move all wicket gate blades 84 to the closed positions 84'. For purposes of maintaining drawing clarity only two such closed wicket gate blade positions 84' are depicted and illustrated in FIG. 5, but it is to be understood that all wicket gate blades would be simultaneously disposed in an adjustably closed 84' position upon concurrent movement of the respective wicket gate adjustment mechanism slip rings 98 by an amount of arrow "X". Likewise, opening of the wicket gates, or any partial open setting thereof between fully open and fully closed, would be by a reverse movement of said slip rings 98 upon extension of the servomotor adjustment linkage 106.

Although the duplex turbine replacement unit invention hereof, the structural characteristics and method of installation and utilization thereof, respectively have been shown and described in what is conceived to be the most practical and preferred embodiment, it is recognized that departures may be made respectively therefrom within the scope of the invention, which is not to be limited per se to those specific details as disclosed herein but is to be accorded the full scope of the claims so as to embrace any and all equivalent such devices, apparatus, and methods.

We claim:

1. A duplex turbine replacement unit adapted for horizontally submersible installation within a headwater chamber of a hydroelectric power plant and comprising in combination; a turbine casing supported by a foundation recess to receive a single pedestal support therefor and adapted to provide a protective air chamber and therewithin mounting a spaced set of aligned bearings to in turn laterally support a turbine drive shaft extending outwardly either side of said casing, a spaced set of runners axially mounting upon said drive shaft either side of said casing and outward of said bearings and profiled in a back-to-back configuration to discharge turbine water respectively therefrom in opposing directions and thereby provide a balanced hydraulic thrust condition upon turbine water flow operation thereof, outwardly projecting and connectably communicating with said casing a radial array of regularly spaced stayvanes for each of said runners each in turn enclosing and being cooperative in directing and controlling turbine water flow with a corresponding radially arrayed set of adjustable wicket gate blades respectively rotatably adjustable on their own axes and having a cooperative wicket gate adjustment means and a drive therefor housed inside said turbine protective air chamber, and a coupling means to connectably join said turbine drive shaft to a generator drive shaft to operationally drive an electrical generator within said hydroelectric power plant.

2. A duplex turbine replacement unit according to claim 1 further including a snorkel tube connectably assembled to said turbine casing and extending vertically upward therefrom whereby maintenance access is provided from the surface level of said headwater chamber in which said turbine is submersibly installed to the protective air chamber within said turbine casing.

3. A duplex turbine replacement unit according to claim 2 wherein said wicket gate adjustment means is comprised of a set of spaced slip rings joined by a slip ring connection arm so that each slip ring is respectively rotatable simultaneously upon a slip ring bearing collar when activated by a servomotor means connected to said slip ring connection arm, and adapted through a plurality of link means each being connected from said slip ring to a corresponding wicket blade shaft whereby an arcuate displacement of said slip ring translates to a corresponding rotational movement simultaneously of each of said wicket gate shafts by a corresponding amount and thereby said wicket gate blades to which said wicket gate shafts are joined are adjustably opened or closed to control flow of turbine water.

4. A duplex turbine replacement unit in combination with an existing power plant having an electrical generator and a civil structure adapted to support a conventional quad turbine installation for submerged turbine operation within a headwater chamber having a foundation floor provided with a pre-existing spaced set of draft tube discharge floor holes therein, said duplex turbine replacement unit comprising a turbine casing supported by a foundation recess to receive a single pedestal support therefor and adapted to provide a protective air chamber and therein mounting a spaced set of aligned bearings to in turn laterally support a turbine drive shaft extending outwardly either side of said casing, a spaced set of runners axially mounting upon said drive shaft outwardly either side of said casing and profiled in a back-to-back configuration to discharge turbine water respectively therefrom in opposing directions and thereby provide a balanced hydraulic thrust condition upon turbine water flow operation thereof, outwardly projecting and connectably communicating with said casing a radial array of regularly spaced stayvanes for each of said runners each in turn enclosing and being cooperative in directing and controlling turbine water flow with a corresponding radially arrayed set of adjustable wicket gate blades respectively rotatably adjustable on their own axes and having a cooperative wicket gate adjustment means housed inside said turbine protective air chamber, a draft tube discharge for each of said runners being respectively connected at one end thereof to said turbine casing and at the other end thereof to one of said pre-existing spaced set of draft tube discharge floor holes, and a coupling means to connectably join said turbine drive shaft to a generator drive shaft to operationally drive said generator within said existing power plant.

5. A duplex turbine replacement unit according to claim 4 further including a snorkel tube connectably assembled to said turbine casing and extending vertically upward therefrom whereby maintenance access is provided from the surface level of said headwater chamber in which said turbine is submersibly installed to the protective air chamber within said turbine casing.

6. A duplex turbine replacement unit according to claim 5 wherein said wicket gate adjustment means is comprised of a set of spaced slip rings joined by a slip ring connection arm so that each slip ring is respectively rotatable simultaneously upon a slip ring bearing collar when activated by a servomotor means connected to said slip ring connection arm, and adapted through a plurality of link means each being connected from said slip ring to a corresponding wicket blade shaft whereby an arcuate displacement of said slip ring translates to a corresponding rotational movement simultaneously of each of said wicket gate shafts by a corresponding amount and thereby said wicket gate blades to which said wicket gate shafts are joined are adjustably opened or closed to control flow of turbine water.

* * * * *